Figure 1:
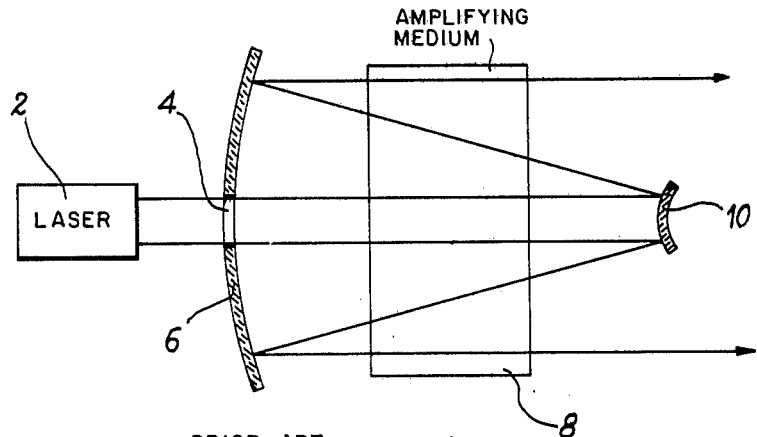

United States Patent [19]
Farcy

[11] 4,093,924
[45] June 6, 1978

[54] DEVICE FOR APPLYING A LASER PULSE DELIVERED BY A LASER OSCILLATOR

[75] Inventor: Jean-Claude Farcy, Briis-sous-Forges, France

[73] Assignee: Commissariat a l'Energie Atomique, Paris, France

[21] Appl. No.: 642,933

[22] Filed: Dec. 22, 1975

[30] Foreign Application Priority Data

Dec. 23, 1974  France .................................. 74 42592

[51] Int. Cl.$^2$ ........................ H01S 3/081; H01S 3/091
[52] U.S. Cl. ................................ 330/4.3; 331/94.5 P; 331/94.5 C
[58] Field of Search ..................... 330/4.3; 331/94.5 C, 331/94.5 D, 94.5 P

[56] References Cited

U.S. PATENT DOCUMENTS

| | | | |
|---|---|---|---|
| 3,460,046 | 8/1969 | Arnaud ............................ | 331/94.5 C |
| 3,732,013 | 5/1973 | Neislmair et al. .............. | 331/94.5 C |
| 3,895,313 | 7/1975 | Seitz ................................ | 331/94.5 C |
| 3,942,127 | 3/1976 | Eluhr et al. ..................... | 330/4.3 |

OTHER PUBLICATIONS

Schappert, "Short Pulse Amplification and Rotational Relaxation in $CO_2$ Amplifiers", 1973, pp. 1–3, 1973, IEEE/OSA Conference.
Girard et al., "$CO_2$ Pulse Lasers", 1974, pp. 446–455, L'Onde Electrique 9.
Shappert, "Rotational Relaxation Effects in Short Pulse $CO_2$ Amplifiers", Sep. 15, 1973, pp. 319–321, Appl. Phys. Lett., vol. 23, #6.
Girard et al., "TEA $CO_2$ Lasers", Nov. 1974, pp. 446–455, Onde Electr. (France), vol. 54, #9.
Amandillo et al., "Pulse Propagation in $CO_2$ Laser Amplifiers", Dec. 21, 1975, pp. 2123–2135, J. Phys. D. (GB), vol. 8, #18.

*Primary Examiner*—Nelson Moskowitz
*Attorney, Agent, or Firm*—Sughrue, Rothwell, Mion, Zinn and Macpeak

[57] ABSTRACT

A light-amplifying medium is pumped by an auxiliary excitation source and has a number of energy levels, the laser transition being intended to correspond to the laser pulse delivered by the oscillator and to take place between the upper laser level and the lower laser level. Mirrors placed around the amplifying medium reflect the laser pulse from one mirror to the next so that the time interval between two successive pulse traversals within the amplifying medium is longer than the time of population transfer between on the one hand the upper reserve level and the upper laser level and on the other hand the lower laser level and the lower reserve level. The amplifying medium is thus regenerated by population exchange at the lower and upper levels between each pulse traversal through the amplifying medium.

6 Claims, 3 Drawing Figures

DEVICE FOR APPLYING A LASER PULSE DELIVERED BY A LASER OSCILLATOR

This invention relates to a device for amplifying laser pulses derived from a laser oscillator, the amplification being performed by means of multiple traversals of the laser beam in a light-amplifying medium pumped by an auxiliary excitation source. After multiple traversals within the amplifier, the output pulse is of very short duration and of very high energy.

Short light pulses of high energy have many industrial applications, either in controlled fusion research or in the welding or drilling of metals and so forth.

An amplifying medium which is particularly well suited to the application of the invention is a laser amplifying medium consisting of nitrogen, carbon dioxide gas and helium which operates between two vibrational-rotational lines of the carbon dioxide gas, which corresponds to emission in the infrared range, for example to 10.6 $\mu$.

A carbon dioxide laser oscillator delivers a short pulse of the order of a few nanoseconds having low energy and the amplifying device in accordance with the invention amplifies said light pulse in order to endow this latter with higher energy.

In lasers of this type, amplifying media or oscillators, the carbon dioxide gas is usually excited by an electric discharge. In order to improve the performances of the laser, the carbon dioxide gas is mixed with nitrogen and in some cases with helium, these gases being subjected to the same electric discharge. The nitrogen subsequently transfers to the carbon dioxide gas a fraction of the excitation energy which it has received from said discharge. When the excitation means such as an electric discharge, for example, deliver an excitation energy to an active medium such as a mixture of carbon dioxide gas and nitrogen, it is known that this energy is stored by population transfer between different energy levels of said active medium. When said transfers produce a population inversion, this may result in amplification of a light pulse by stimulated emission. In the mixture of nitrogen and carbon dioxide gas, a large number of distinct energy levels are utilized at the time of excitation and amplification processes. These levels are well known to those versed in the art and the same applies to the processes of population transfer between these different levels. In order to simplify the description, consideration may be given to only four types of levels which can be designated by decreasing energies:
upper reserve levels,
upper laser level,
lower laser level,
lower reserve levels.

A well-known distribution of population in which the population is greater as the energy level is lower is established between the above-mentioned levels as a result of spontaneous transfer processes at thermal equilibrium. In a first stage, the excitation process makes the population of the upper laser level greater than that of the lower laser level or in other words produces a population inversion which is accompanied by an absorption of energy by the active medium. In a second stage, the amplification process results from a population transfer from the upper laser level to the lower laser level. Said transfer is stimulated by the radiation to be amplified, supplies energy to said radiation and amplifies this latter as long as population inversion is maintained. It is apparent under these conditions that the energy supplied to the radiation by the amplification process is limited to the energy stored by the active medium in the form of population inversion between the upper and lower laser levels. In fact, the energy supplied to the radiation by the amplification process can be greater than the energy stored initially by the active medium in the form of population inversion between the upper and lower laser levels. This arises from the fact that a fraction of the energy supplied by the excitation means has been stored in the active medium as a result of an increase in the population of the upper reserve level or levels and also as a result of a decrease in the population of the lower reserve level or levels with respect to all the populations of the laser levels and in comparison with the distribution at thermal equilibrium. When the amplification process causes a reduction in population inversion between the upper and lower laser levels, spontaneous population transfers accordingly compensate for this reduction in two ways: in the first place, when the amplification process has depopulated the upper laser level to a sufficient extent, there appears a deficiency of the population of said level with respect to the population of the upper reserve level or levels and this results in spontaneous transfer which repopulates the upper laser level. In the second place, when the process of amplification has increased the population of the lower laser level, there appears an excess of said population with respect to the lower reserve levels and this results in spontaneous transfer which depopulates the lower laser level.

There in fact exists a large number of upper reserve levels and of lower reserve levels. It is nevertheless true to state that these spontaneous transfers increase the quantity of energy which it is possible to supply to the radiation to be amplified and this is one of the reasons for which lasers of the $CO_2$—$N_2$ type have a particularly high energy efficiency. Unfortunately, the transfers mentioned above are not as rapid as could be desired. For example, in the nitrogen-carbon dioxide gas mixture at atmospheric pressure, these transfer times vary between 0.1 ns and a few tens of nanoseconds, depending on whether consideration is given to the times of transfer between rotational and vibrational levels or between nitrogen and carbon dioxide gas. In the case of the $CO_2$ laser and relatively short times of the order of a few nanoseconds, the population transfer can take place only between the rotational levels corresponding to the same vibrational level. The different rotational levels other than those employed in the laser transition accordingly constitute the reserve levels. In the case of longer time intervals, the population transfer also takes place with the vibrational level of nitrogen. In point of fact, it is sometimes desired to obtain high-energy pulses having a duration shorter than a few nanoseconds. The spontaneous population transfers have the time to take place only to a partial extent during a pulse of such short duration. By way of numerical illustration, a mixture at atmospheric pressure of carbon dioxide gas and nitrogen which is suitably excited and capable at the outset of the amplification process of producing a gain of 10 dB per meter can impart to a pulse of 1 nanosecond an energy of 3 Joules per liter of the mixture. This value becomes 10 Joules per liter in the case of a pulse having a time-duration of 70 nanoseconds and becomes 20 Joules per liter in the case of a pulse having a time-duration of 1000 nanoseconds.

In order to increase the quantity of energy which can be supplied to a light pulse by an active medium, it is a known practice to pass said pulse through the active medium a number of times. Provision is accordingly made for what is known as a multi-pass device comprising mirrors for reflecting the light pulse which has passed through the active medium a first time and for causing said pulse to undergo a second pass followed by a third pass. However, these known multi-pass systems have a disadvantage in that, by reason of the generally coaxial arrangement of the mirrors provided, the passes to which they are capable of subjecting the light are limited to a small number and it is difficult to employ a substantial portion of the active medium at each pass.

It must be pointed out that, in some multi-pass devices of the prior art in which mirrors are placed in oppositely-facing relation on each side of an active medium, there is a potential danger of self-oscillations. In other words, it is possible to form a laser oscillator with said mirrors and said active medium whereas the present invention relates to a device in which the laser amplifier is not intended to produce light oscillations itself but only to amplify the oscillations produced by an external oscillator.

Certain geometrical arrangements of non-coaxial mirrors have been proposed in conjunction with active amplifying media, for example in French Pat. No. 1,361,121 delivered on Apr. 6, 1964 in Paris to the Raytheon Company and corresponding to U.S. patent Application filed on June 27, 1962 under Ser. No. 205,597 in the name of Said Koozekahani and Peter Debye.

However, the object of these configurations is not to permit spontaneous transfer of population of certain reserve levels to the laser levels between two passes and the problems to be solved are therefore of different nature to those of the invention.

The precise aim of the present invention is to provide a device for amplifying a laser pulse delivered by a laser oscillator, wherein said device comprises:
 a light-amplifying medium which is pumped by an auxiliary excitation source and comprises a number of energy levels, one or a number of upper reserve levels, an upper laser level, a lower laser level and one or a number of lower reserve levels, the laser transition being intended to correspond to the laser pulse delivered by the oscillator and to take place between the upper laser level and the lower laser level,
 a set of mirrors $M_1, M_2, M_3, M_4 \ldots$ placed around the amplifying medium, said mirrors being intended to reflect the laser pulse from one mirror to the following mirror of the series of mirrors. The mirrors are so arranged as to ensure that the time interval $\Delta t_1$ which elapses between two successive passes of the pulse within the amplifying medium is longer than the time interval $\Delta t_2$ which is necessary for population transfer between on the one hand the upper reserve level or levels and the upper laser level and on the other hand the lower laser level and the lower reserve level or levels, with the result that the amplifying medium is regenerated by population exchange at the lower and upper levels between each traversal of the pulse through the amplifying medium.

Two embodiments of the invention will now be described below with reference to the accompanying drawings which are given by way of explanation without any limitation being implied, the elements which correspond in a number of figures being designated by the same references.

Figure 2:
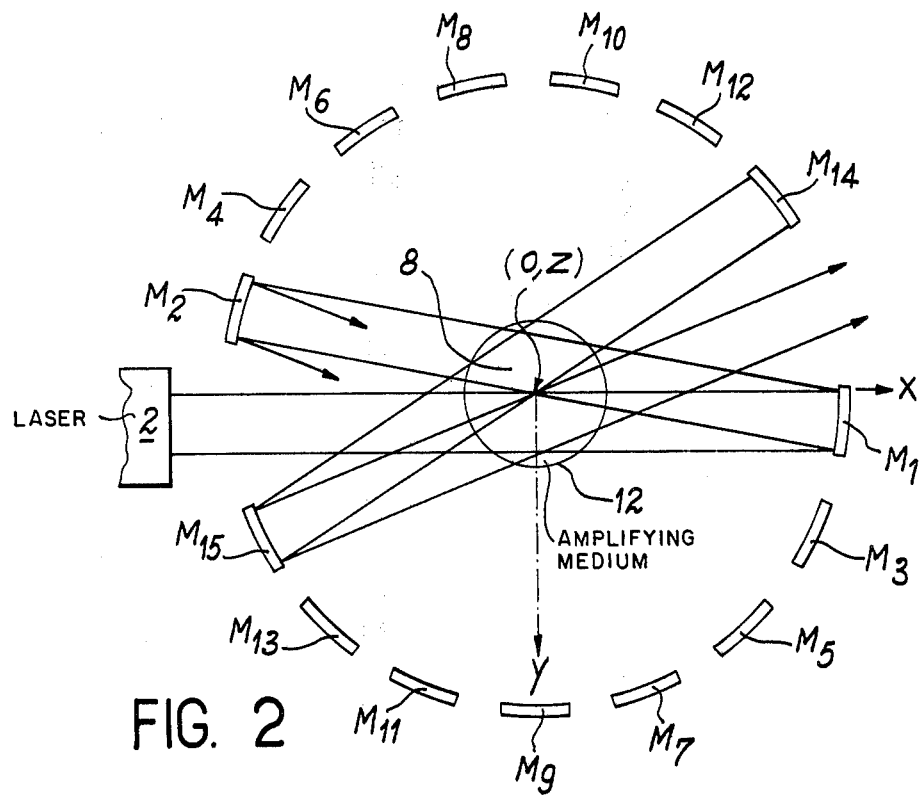
Figure 3:
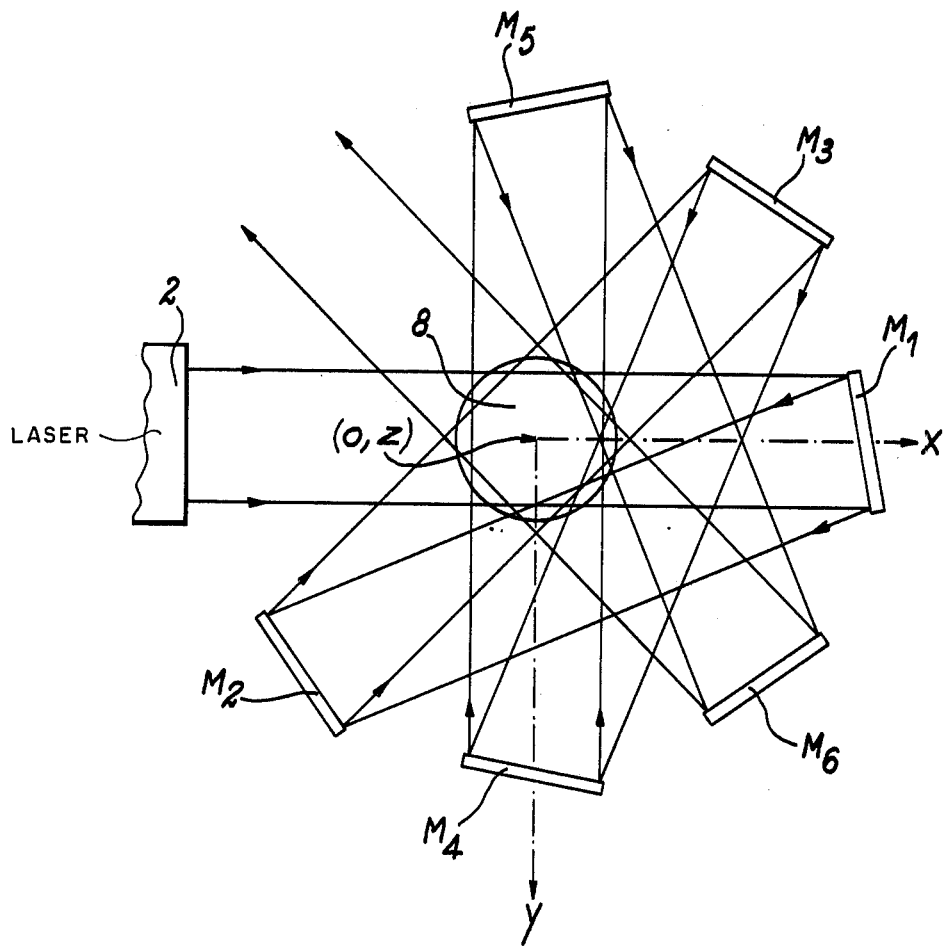

In these drawings:
 FIG. 1 is a sectional view of a device in accordance with the prior art;
 FIG. 2 is a sectional view of a first embodiment of the invention;
 FIG. 3 is a sectional view of a second embodiment of the invention.

As shown in FIG. 1, a laser oscillator 2 delivers a short light pulse of low energy in the form of a parallel beam having a small cross-sectional area. Said beam first passes through a central aperture 4 of a concave spherical mirror 6 having a large surface area and an axis which is parallel to the beam. Said beam then passes through an active amplifying medium 8 which is coaxial with the mirror 6 and has substantially the same diameter. Said parallel beam then impinges upon a concave mirror 10 which is coaxial with the mirror 6 and the surface area of which is substantially equal to that of the aperture 4. The mirror 10 reflects the parallel beam of small section in the form of a divergent beam through the active medium 8 towards the concave mirror 6 in order to ensure that, when it strikes said concave mirror 6, said beam occupies the greater part of the surface of this latter. The mirrors 6 and 10 form an afocal system; in other words, the divergent beam received by the concave mirror 6 is reflected from this latter in the direction of the active medium 8 in the form of a parallel beam of substantial section which passes practically through the entire volume of said active medium. The low-energy pulse delivered by the oscillator 2 therefore passes three times through the active medium 8 and is amplified on each pass so as to be finally converted to an output pulse carried by a light beam which has a substantial section and high energy.

If the mirrors 6 and 10 are located at a sufficient distance on each side of the active medium 8, it can readily be seen that, in the known multi-pass device, the phenomenon of spontaneous population transfer which can exist within the active medium 8 makes it possible to increase the energy of the output pulse since a certain period of time elapses between the first and the third traversal of the pulse through said active medium. However, it appears that, unless the distance between the mirrors 6 and 10 and consequently the overall dimensions of the generator as a whole are unduly increased, the aforesaid coaxial arrangement of said mirrors does not make it possible to increase the time interval between the first and the last traversal of the pulse through the active medium 8 as much as may be desired. Moreover, some portions of said active medium are traversed by the light pulse only twice or even only once: in other words, the possibilities of improvement of the energy efficiency which are related to the phenomenon of spontaneous population transfer are utilized only to a partial extent.

In the first embodiment of the invention shown in FIG. 2, an oscillator 2 delivers a short low-energy pulse in the form of a beam of rectangular cross-section. Assuming for the sake of enhanced clarity of the description that the plane $Oxy$ of FIG. 2 is a horizontal plane, the sides of the rectangular cross-section of the beam delivered by the oscillator 2 are vertical and horizontal. Said beam is directed towards an active medium 8 having the shape of a right cylinder of circular cross-section, the height of which coincides substantially with that of the beam produced by the oscillator 2. One of the vertical planes which limits the beam in the lateral direction passes substantially through the axis Oz of the active medium 8 whilst the other vertical plane which limits said beam is substantially tangent to the cylindrical surface 12 which limits said active medium.

The pulse delivered by the oscillator 2 thus effects a first traversal through a portion of the active medium 8 and then impinges on a plane or very slightly concave mirror $M_1$ which is parallel to the axis Oz, the surface of which coincides substantially with a section of the light beam. The light pulse is reflected from said mirror to said active medium and caused on its second pass to traverse a portion of said active medium which is approximately symmetrical with the portion traversed at the time of the first pass subject, however, to a slight angular displacement. After the second pass through the active medium 8, the pulse is received by a second mirror $M_2$ which is similar to the mirror $M_1$ and so arranged as to reflect the pulse into the active medium 8 in order that said pulse should perform a third pass and so forth. Thus the pulse performs a large number of successive passes through the active medium 8 and traverses on each pass only one-half the volume of said active medium.

Each mirror $M_1$ to $M_{15}$ has a substantially rectangular shape and is limited in height by the two horizontal planes which limit the active medium 8. All these mirrors are either plane or slightly concave in order to maintain a substantially constant cross-section of the light beam in spite of the phenomenon of divergence which is observed within the amplifying medium and progressively affects the entire light beam which is parallel at the outset. The mirrors $M_1$ to $M_{15}$ are all parallel to the axis Oz. They are all equidistant from the axis Oz and are made to correspond to each other by simple angular displacements about said axis Oz. The mirror planes are never parallel to each other in pairs in order to prevent self-oscillations within the amplifier and form a succession within which each mirror has an order $i$. This succession corresponds to the succession of passes of the pulse through the active medium 8: each mirror of order $i$ receives said pulse after this latter has undergone a traversal or pass of the same order $i$ through said active medium, the mirror being arranged so as to reflect the pulse into the active medium by subjecting it to a pass of order $i + 1$ through a portion of said medium which does not coincide with that which was traversed at the time of the pass of order $i$.

In the example which has just been described, the aforesaid portions of the active medium are substantially halves of the volume of said medium but these portions could also be either larger or smaller than one-half of said volume; it would also be possible to ensure that, at the time of each pass, a portion of the beam which transports the light pulse passes outside the active medium, namely the portion which is farthest away from the axis Oz, it being understood that said non-amplified portion would pass through said active medium in order to be amplified at the time of the following traversal of the pulse through the active medium. After its fifteenth pass through the active medium 8, the light pulse received by the mirror $M_{15}$ is reflected from this latter to the active medium 8 in order to subject said pulse to a sixteenth pass, after which it no longer encounters any mirrors such as those designated by the references $M_1, M_2 \ldots M_{15}$. The output pulse of the generator in accordance with the invention is thus obtained.

It is worthy of note that, in this arrangement, the portions of the light beam which are the least amplified at the time of one pass through the active medium 8 are the portions which are farthest from the axis of the cylinder. Accordingly, these portions are the most strongly amplified at the time of the following pass in the vicinity of the axis; this plays a part in improving the homogeneity of the beam which transports the short, high-energy light pulse which is finally delivered by the generator in accordance with the invention.

The advantage of the arrangement in accordance with the invention lies in the fact that the light pulse can be caused to carry out a very large number of passes through the active medium 8. It is therefore possible without placing the mirrors aforesaid at an excessive distance to give a sufficient value to the time interval which elapses between the first and the second pass, this value being sufficient to permit the phenomenon of spontaneous population transfer to take place to a substantial extent.

It can be mentioned by way of numerical example that the active medium 8 has a diameter of 67 cm and a height of 20 cm. The mirrors $M_1$ to $M_{15}$ are loacted at a distance of 2 meters from the axis 12. The light pulse has an energy of approximately 2 Joules as it enters the active medium. Said active medium which is constituted by a mixture of 4 volumes of helium, 1 volume of carbon dioxide gas and 1 volume of nitrogen at atmospheric pressure permits delivery of an output pulse with an energy of 280 Joules. The time-duration of said pulse is 2 nanoseconds but could be reduced substantially below 1 nanosecond.

The excitation of the active medium 8 can be carried out by means of an electric discharge between two circular, flat or horizontal electrodes which delimit said active medium, that is, which are separated by a distance of 20 cm and have a diameter of approximately 67 cm. Said discharge is carried out at a voltage of 100 to 200 kV with a current intensity of 2 to 20 A/cm$^2$ and a time-duration of 0.5 to 5 $\mu$s. By way of example, the pre-ionization source can be an electron gun which operates at 150 to 200 kV with a current intensity of 50 mA/cm$^2$ and is separated from the active medium by a titanium sheet having a thickness of 20 $\mu$ and permeable to electrons. Alternatively, said source can consist of any other devices which are well-known at the present time and permit homogeneous high-energy discharges at high pressure in the $CO_2$, $N_2$, He mixture.

The gas mixture which constitutes the active medium 8 can fill the entire volume of a chamber which includes the mirrors $M_1$ to $M_{15}$. It is also possible to place said gas mixture only in a volume corresponding to that of the active medium 8 and delimited laterally by a detachable sealing device which is removed just before the light pulse is passed through said active medium. The light beam is thus prevented from passing on each traversal through the windows which delimit the active medium as this would produce losses of power or losses by absorption of the non-excited gas.

The second preferential embodiment of the invention which is shown in FIG. 3 is very similar to the first embodiment. Only the differences between these two modes will be explained hereinafter.

The short light pulse of low energy which is delivered by the oscillator 2 in the form of a parallel beam having a rectangular cross-section passes through the entire volume of the active medium 8. The width of the light beam coincides substantially with a diameter of said active medium. After its initial passage through said active medium, the light pulse is received by a first reception mirror $M_1$ which is plane or slightly concave and the surface of which coincides substantially with a section of the light beam. Said mirror is parallel to the axis $Oz$ of the active medium 8 and its axis is substantially tangent to the cylindrical lateral surface which delimits the active medium 8. As a result, the first mirror $M_1$ reflects the light pulse onto the mirror $M_2$ after amplification through the amplifying medium 8. The light beam then passes in the immediate vicinity of the active medium 8 without passing through this latter. The mirror $M_2$ which is similar to the mirror $M_1$ returns the beam to the active medium 8 in order to cause said beam to pass again through its entire volume. The light pulse is then received by the mirror $M_3$ and then reflected from this latter to the mirror $M_4$ and so forth.

In the example which is illustrated, provision is made for six mirrors so that the pulse carries out four traversals through the entire volume of the active medium 6. The mirrors are all equidistant from the axis $Oz$ and their surface is parallel to said axis. Their axes are substantially tangent to the cylindrical surface which delimits the active medium 8. The positions of the mirrors are deduced from each other by angular displacement about the axis $Oz$. Each mirror of order $i$ receives the light pulse after this latter has passed through the active medium 8 and reflects said pulse to the mirror of order $i + 1$ without passing through the active medium. Said mirror of order $i + 1$ reflects the pulse into the active medium and causes this latter to pass once again through said medium.

By way of numerical example, the active medium being constituted by the same mixture as the one mentioned earlier and excited in the same manner with the same voltages and the same current densities, the height of the active medium being again 20 cm, the diameter of the active medium 8 can be 1.3 meter. The distance between the mirrors can be 2.5 meters. The pulse delivered by the oscillator 2 can have an energy of 10 Joules and a time-duration of 1 nanosecond. The output pulse delivered by the generator can attain 960 Joules.

The device in accordance with the invention is advantageously applicable to the $CO_2$ amplifying medium but can also be employed for active media having fast spontaneous population transfer such as the iodine laser media which emit at 1.315 p.

What I claim is:

1. A device for amplifying a laser pulse delivered by a laser oscillator, wherein said device comprises:

a light-amplifying medium which is pumped by an auxiliary excitation source and comprises a number of energy levels, one or a number of upper reserve levels, an upper laser level, a lower laser level and one or a number of lower reserve levels, the laser transition being intended to correspond to the laser pulse delivered by the oscillator and to take place between the upper laser level and the lower laser level, a series of mirrors placed around the amplifying medium to reflect said laser pulse from one mirror to the following mirror of the series of mirrors, wherein the mirrors are so arranged as to ensure that the time interval $\Delta t_1$ which elapses between two successive passes of the pulse within the same volume of the amplifying medium is longer than the time interval $\Delta t_2$ which is necessary for population transfer between on the one hand the upper reserve level or levels and the upper laser level and on the other hand the lower laser level and the lower reserve level or levels, with the result that the amplifying medium is regenerated by population exchange at the lower and upper levels between each traversal of the pulse through said amplifying medium, wherein the amplifying medium is placed between two parallel planes which are perpendicular to an axis $Oz$ and wherein said mirrors are oriented so as to ensure that the path of the light pulse between said mirrors is perpendicular to said axis $Oz$.

2. A device for amplifying a laser pulse delivered by a laser oscillator, wherein said device comprises:

a light-amplifying medium which is pumped by an auxiliary excitation source and comprises a number of energy levels, one or a number of upper reserve levels, an upper laser level, a lower laser level and one or a number of lower reserve levels, the laser transition being intended to correspond to the laser pulse delivered by the oscillator and to take place between the upper laser level and the lower laser level, a series of mirrors placed around the amplifying medium to reflect said laser pulse from one mirror to the following mirror of the series of mirrors, wherein the mirrors are so arranged as to ensure that the time interval $\Delta t_1$ which elapses between two successive passes of the pulse within the same volume of the amplifying medium is longer than the time interval $\Delta t_2$ which is necessary for population transfer between on the one hand the upper reserve level or levels and the upper laser level and on the other hand the lower laser level and the lower reserve level or levels, with the result that the amplifying medium is regenerated by population exchange at the lower and upper levels between each traversal of the pulse through said amplifying medium, wherein the amplifying medium is in the shape of a cylinder having an axis of revolution $Oz$, wherein the width of the laser beam in a plane $Oxy$ perpendicular to the axis $Oz$ is approximately equal to the radius of the circular section of the amplifying medium in the same plane $Oxy$, wherein the series of mirrors includes $n$ mirrors, $M_1, M_2 \ldots M_i, \ldots M_n$, of substantially rectangular shape which are disposed annularly at a uniform angular interval around the amplifying medium, the planes of said mirrors being parallel to the axis $Oz$, wherein the amplifying medium is so arranged that the beam issuing from the laser oscillator passes substantially through a first half of the volume of the amplifying medium, wherein the first mirror $M_1$ is so oriented as to reflect the beam issuing from the oscillator to the mirror $M_2$ after passing through the second half of the volume of the amplifying medium, the beam being reflected from the mirror $M_2$ onto the mirror $M_3$ after passing through another half of the amplifying medium, said beam being reflected from the mirror $M_i$ having an order $i$ to the mirror $M_{i+1}$ onto the mirror $M_{i+2}$ after passing through a second half of the amplifying medium, the beam which has thus been amplified being reflected to the exterior from the last exit mirror $M_n$ after passing through the amplifying medium.

3. A device for amplifying a laser pulse delivered by a laser oscillator, wherein said device comprises:
- a light-amplifying medium which is pumped by an auxiliary excitation source and comprises a number of energy levels, one or a number of upper reserve levels, an upper laser level, a lower laser level and one or a number of lower reserve levels, the laser transition being intended to correspond to the laser pulse delivered by the oscillator and to take place between the upper laser level and the lower laser level,
- a series of mirrors placed around the amplifying medium to reflect said laser pulse from one mirror to the following mirror of the series of mirrors, wherein the mirrors are so arranged as to ensure that the time interval $\Delta t_1$ which elapses between two successive passes of the pulse within the same volume of the amplifying medium is longer than the time interval $\Delta t_2$ which is necessary for population transfer between on the one hand the upper reserve level or levels and the upper laser level and on the other hand the lower laser level and the lower reserve level or levels, with the result that the amplifying medium is regenerated by population exchange at the lower and upper levels between each traversal of the pulse through said amplifying medium, wherein the amplifying medium is of cylindrical shape having an axis $Oz$ wherein, in a plane $Oxy$ perpendicular to the axis $Oz$, the width of the laser beam emitted by the laser oscillator is substantially equal to the diameter of the circular cross-section of the amplifying medium in the same plane $Oxy$, wherein the device comprises $n$ rectangular mirrors $M_1, M_2 \ldots M_i, \ldots M_n$ disposed at uniform angular intervals around the amplifying medium, the plane of said mirrors being parallel to the axis $Oz$, wherein the amplifying medium is so arranged that the beam issuing from the laser oscillator passes through the volume of the amplifying medium, wherein the first mirror $M_1$ is oriented so as to reflect the beam issuing from the oscillator to the mirror $M_2$ but does not pass through the amplifying medium between the mirrors $M_1$ and $M_2$, the beam being reflected from the mirror $M_2$ onto the mirror $M_3$ after passing through practically the entire amplifying medium, said beam being reflected from the mirror $M_i$ to the mirror $M_{i+1}$ after passing through the volume of the amplifying medium and said beam being reflected from the mirror $M_{i+1}$ onto the mirror $M_{i+2}$ but does not pass through the amplifying medium between the mirror $M_{i+1}$ and the mirror $M_{i+2}$, the amplified beam being reflected from the last exit mirror $M_n$ after a final pass through the amplifying medium.

4. A device according to claim 1, wherein the mirrors are plane mirrors.

5. A device according to claim 1, wherein the mirrors are slightly concave mirrors.

6. A device according to claim 1, wherein the laser oscillator is a carbon dioxide laser oscillator which emits in the infrared range and wherein the amplifying medium is a mixture containing especially carbon dioxide and nitrogen, said amplifying medium being pumped by electric discharge.

* * * * *